(No Model.) 3 Sheets—Sheet 1.
T. E. MARTIN.
SPRAYING APPARATUS.
No. 598,945. Patented Feb. 15, 1898.
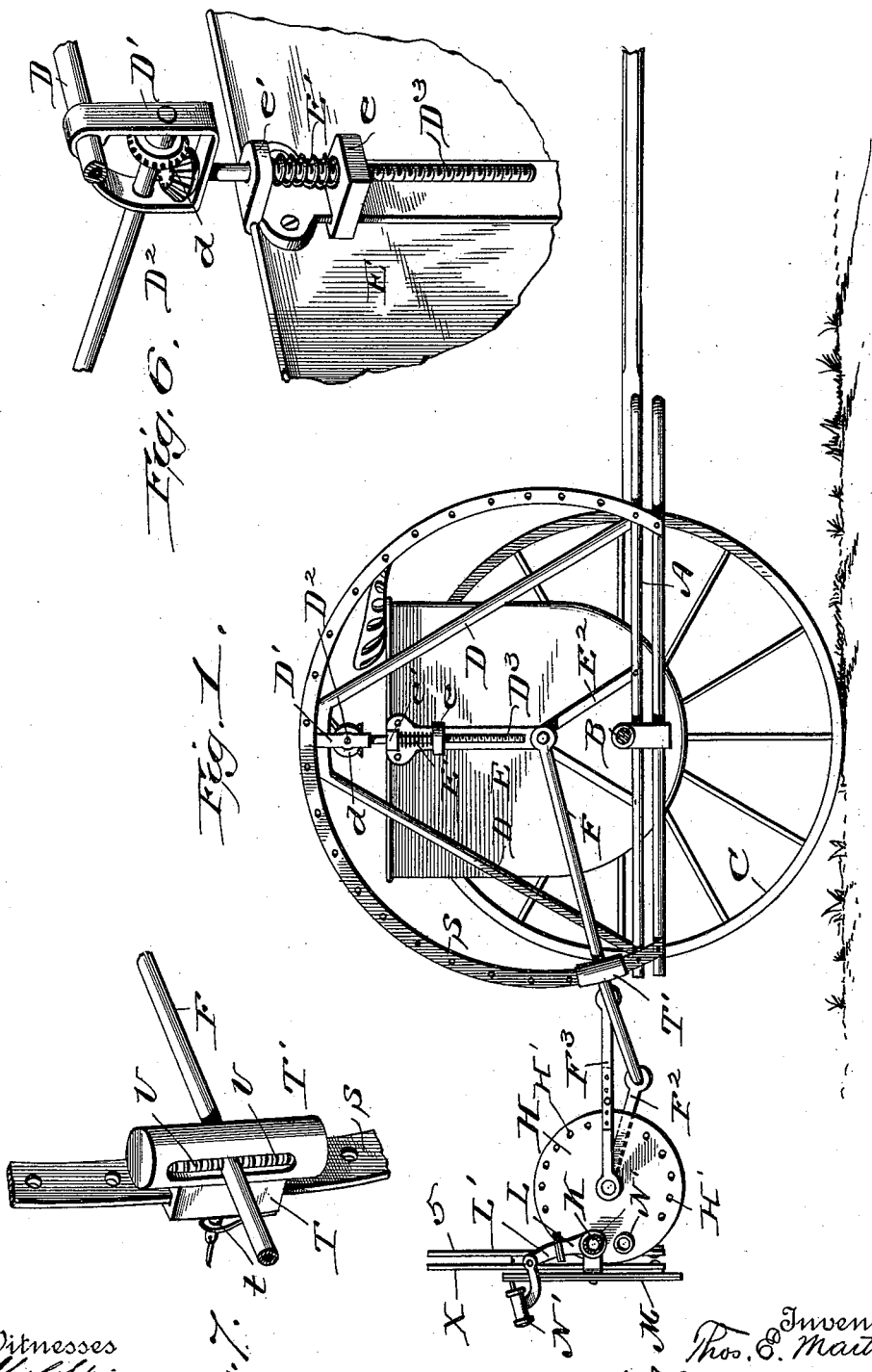
Witnesses
Inventor
Thos. E. Martin,
by Franklin H. Hough
Attorney (No Model.) 3 Sheets—Sheet 2.
T. E. MARTIN.
SPRAYING APPARATUS.
No. 598,945. Patented Feb. 15, 1898.
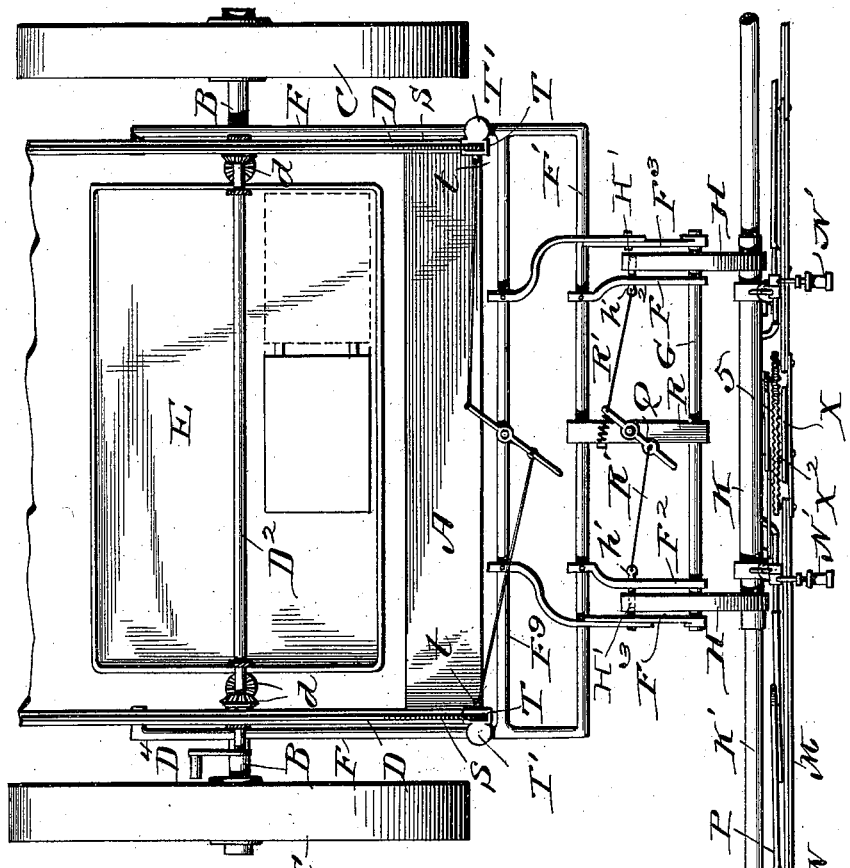
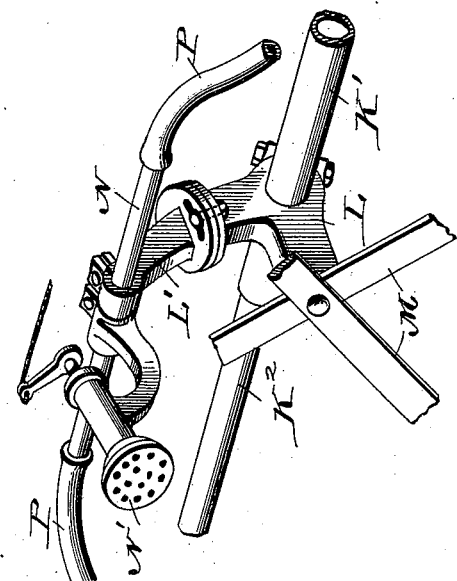
Witnesses
Inventor
Thos. E. Martin,
by Franklin H. Hough
Attorney

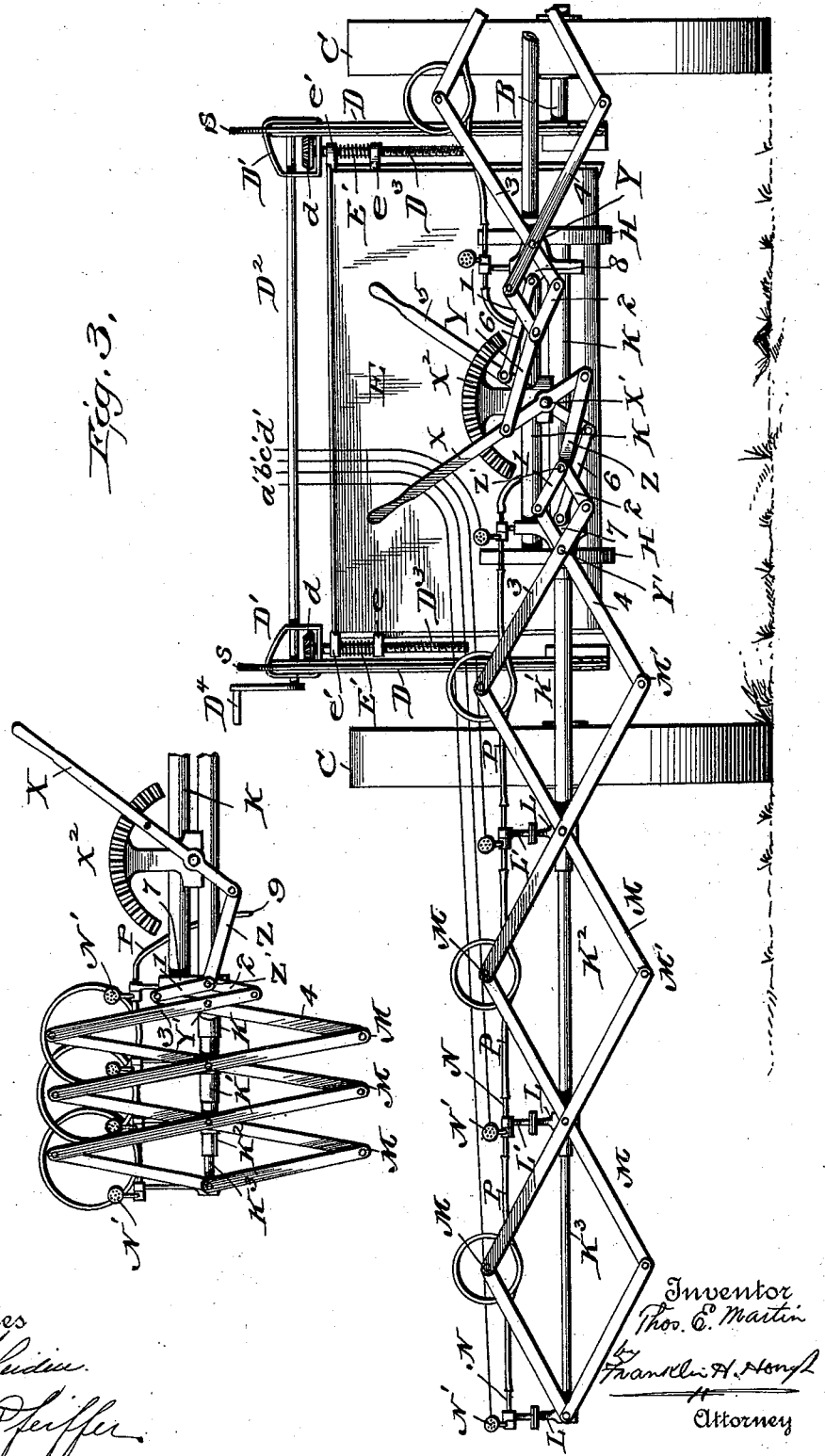

UNITED STATES PATENT OFFICE.

THOMAS EUGENE MARTIN, OF NORTH RUSH, NEW YORK.

SPRAYING APPARATUS.

SPECIFICATION forming part of Letters Patent No. 598,945, dated February 15, 1898.

Application filed September 1, 1897. Serial No. 650,286. (No model.)

*To all whom it may concern:*

Be it known that I, THOMAS EUGENE MARTIN, a citizen of the United States, residing at North Rush, in the county of Monroe and State of New York, have invented certain new and useful Improvements in Spraying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for spraying vines, bushes, &c., and it is my purpose to construct mechanism of this character whereby a number of rows may be sprayed at the same time, means being provided for easily and quickly adjusting the machine to adapt it to spray rows at different distances apart and at any angle, the apparatus being detachably secured to any suitably-constructed truck.

More specifically the invention resides in the provision of a lazy-tongs arrangement of links which are designed to be distended in a horizontal plane by suitable operating-levers within convenient reach of the operator, an auxiliary lever being provided to adjust the distance between the inner ends of the two pairs of lazy-tongs. In connection with the extensible tongs, which are supported by telescoping members mounted on the framework of the machine, spraying tubes and nozzles are carried, and a supply-tank which is carried by the truck has hose connection with the tubes to feed out the poison which has been previously mixed with the water in the tank.

A further part of the invention resides in provision of means whereby the height at which it is desired to hold the telescoping mechanism may be regulated as well as the angle at which it is desired to have the lazy-tongs disposed with reference to the surface of the ground. In connection with the tank is provided mechanism for raising or lowering the same for convenience in filling, &c., while on suitably-arranged segment-arms secured to the truck are arranged sockets carrying springs designed to bear against the pivoted frame carrying the telescoping mechanism for taking up vibrations, as when going over rough ground.

To these ends and to such others as the invention may pertain the same consists, further, in the novel construction, combination, and adaptation of the parts, as will be hereinafter more fully described, and then specifically defined in the appended claims.

The invention is clearly illustrated in the accompanying drawings, which, with the letters and figures of reference marked thereon, form a part of this application, and in which drawings similar letters and figures of reference indicate like parts throughout the several views, in which—

Figure 1 is a side elevation of a truck, showing tank and spraying apparatus attached thereto. Fig. 2 is a top plan view of the same. Fig. 3 is a rear elevation showing the manner of adjustment of the telescoping mechanism operated by lazy-tongs. Fig. 4 is a detail view showing the lazy-tongs folded. Fig. 5 is a detail in perspective of a portion of the spraying-hose with nozzle connected thereto. Fig. 6 is a detail view showing the mechanism for raising and lowering the tank. Fig. 7 is a detail view showing the socket mounted on the segment-strips and carrying springs to take up the vibrations of the sprayer-frame.

Reference now being had to the details of the drawings by letters and figures, A designates the truck, mounted on the axle B, carried on the wheels C. Secured to the said truck-frame are the inclined tank-supporting strips D, to the upper portions of which are fastened the brackets D', in which are journaled the ends of the shafts $D^2$ and $D^3$, each of which is provided with beveled gear-wheels $d$, meshing with each other. The shafts $D^3$ are screw-threaded and have threaded connections with the movable nuts $e$ on the tank E and pass loosely through the apertured eyes $e'$, and E' are springs provided to take up any vibrations coming upon the tank. A suitable operating-handle $D^4$ is keyed to the shaft $D^2$, and by turning the same in one direction or the other the tank may be easily and quickly raised or lowered.

F are the sprayer-carrying rods, which have their pivoted ends bent at right angles to the length of the rods and engage in apertures in standards E², as shown in the drawings. The bars or rods F are connected together by the rod F', to which rod the bars F² are connected at their forward ends, while at their other ends they are journaled to the shaft G, which has keyed or otherwise secured thereto the wheels H, which have two large apertures H' therein, provided to receive the larger sections K of the telescoping apparatus. The members F³ are journaled on shaft G and piece F⁹ and may be made adjustable.

Located at suitable distances apart on the telescoping sections K', K², and K³ are the bracket members L, rigidly held at the outer ends of the said sections, and to each of the said bracket members is carried a pivot-pin, to which the links M of the lazy-tongs are pivoted near their middle portions, while the adjacent meeting ends are pivoted together, as shown at M'. Secured to each of the bracket members L is an integral arm L', which may be swiveled, designed to receive a metallic section of a pipe N, to which is connected a nozzle N', which may be of any suitable construction. Connected to each end of the said pipes, each provided with a nozzle, are the flexible hose-pipes P, which will allow the telescoping sections carrying the lazy-tongs to readily fold or to be extended. In Fig. 3 of the drawings the tongs are represented as being extended, while in Fig. 4 they are shown in a folded relation. It will be noted that in the drawings only a portion of one side of the apparatus is shown. Both sides are to be identically arranged, and as many telescoping sections and lazy-tongs may be employed as desired; also, lazy-tongs, &c., can be operated ahead of drive-wheels, as well as in the rear.

When it is desired to change the angle at which the operator wishes the nozzles to be disposed, the wheels H, provided with the apertures H' therein, may be revolved upon their axes and held in a given position with reference to the axes by passing the pin h' through registering apertures in the wheels and the bars F² and F³, which support the wheels and vary the angle. At each end of the shaft G is a similarly-arranged wheel, and both wheels H are engaged by the pins h', and said pins are connected to the operating handle or lever Q, which is pivoted to the cross-piece R on the framework by means of the rods R'. These pins are provided with a spring, if desired, so that they will be normally held in a locking position.

In order to regulate the height at which it is desired to carry the rods F, which support the spraying apparatus, the segment members S are provided, which are secured at their ends to the framework of the truck, as shown plainly in Fig. 1 of the drawings. The sliding bracket members T are placed upon this segment-bar, one on each side, and an integral hollow casing T' carries the springs U, one above and the other below the rod F, provided to take up any vibration that may be imparted to the said rods, which support the spraying apparatus. To hold the said brackets T at a given height on the segment members, a pin t is placed in registering apertures in the bracket and segment, or, if preferred, a lever may be used instead of pin t.

For extending and closing the lazy-tongs the lever X is employed, which lever is pivoted, as at X', to the downwardly-extending portion of the casting held to member K, having the segment X², while the links Y and Z, pivoted to the said lever X, have pivoted to their other ends on a common pivot Z' the short links 1 and 2 and links 3 and 4 on pivots Y'. A pawl or ratchet may be carried on said operating-handle, whereby the latter may be held at a given location on the segment member. If desired, two similarly-arranged operating-handles may be employed, so arranged that but one set of the lazy-tongs may be opened and closed at a time.

To regulate the distance apart at which it is desired to adjust the inner two of the nozzles, which would not be regulated by the lazy-tongs apparatus, I provide the second lever 5, which may be pivoted on pivot X' and has connection through the medium of the links 6, which have their other ends connected with the brackets 7 and 8, which latter slide on the larger of the telescoping sections K. This latter-mentioned lever may be held by a ratchet to the said segment X² on the opposite side from that engaged by the ratchet carried by the lever X.

A suitable pipe connection 9, Fig. 4, may connect the reservoir or tank with the pipes carrying the nozzles, allowing the water to fall by gravity or the pressure in the tank or a pump forcing same through the hose and to the nozzles.

It is my purpose to make the improved sprayer of such a construction as to allow it to be readily detached and to apply to the truck a device for gathering and destroying potato-bugs, which latter invention will form the subject-matter for a separate application. The several spraying devices N' are operated by means of cords or wires a' b' c' d', which are attached to levers controlling the degorgers and valves, as clearly shown in Fig. 5 of the drawings.

Having thus described my invention, what I claim to be new, and desire to secure by Letters Patent, is—

1. A sprayer, comprising in combination with a truck and tank mounted thereon, lazy-tongs and nozzles mounted on the said truck, hose connection between said nozzles and tank, means for extending and closing the said tongs carrying the nozzles.

2. In a sprayer, a truck and tank mounted thereon, the lazy-tongs mounted on the said truck, nozzles carried by the said tongs, hose connections between the tank and the nozzles, and means for adjusting the angle at which it is desired to dispose the nozzles, substantially as set forth.

3. In a sprayer, the combination with the truck and tank, the sprayer-frame carried by the truck, the telescoping members supported on the said frame, the lazy-tongs secured to the telescoping members, nozzles and pipe connections between the same and tank, and means for opening and closing telescoping members.

4. In a sprayer, the combination with the truck and tank, the sprayer, the supporting-rods therefor, pivoted to the truck-standard, segments mounted on the truck, the slotted casings working on the said segments and designed to carry the said rods, and means for holding the slotted casings at a given height on the segments, substantially as set forth.

5. In combination with the truck and tank mounted thereon, the segments S, the sprayer-carrying rod F pivoted to a portion of the truck, the slotted casing T mounted on one of the segments, and thumb-screw carried thereby, and the springs bearing against the opposite sides of the rod F in an elongated aperture in the said casing, substantially as shown and described.

6. In a sprayer, the combination with the truck and tank mounted thereon, the sprayer-frame rods pivoted to standards on the truck, the shaft G carried at the rear ends of the said rods F, the apertured wheels H mounted on the said shaft, the telescoping members mounted securely in apertures in the said wheels, the brackets secured to the telescoping sections, lazy-tongs pivoted to the said brackets, the nozzles supported by the brackets, the flexible hose-pipe connections between the nozzles and the tank, operating-lever for opening and closing said telescoping members, substantially as shown and described.

7. In a spraying device, the combination with the truck and tank mounted thereon, the standard $E^2$ and sprayer-frame rods F pivoted thereto, rods $F^2$, the shaft G pivoted to the rear ends of the rods $F^2$, the wheels H mounted on said shaft, the telescoping rods mounted in the said wheels, the brackets L, the links of the lazy-tongs M pivoted to said brackets at their center and to the ends of one another at M', the nozzles and flexible pipe connections between the same and the tank, the operating-lever X having link connection with the said lazy-tongs and the lever 5 connected by suitable links to the said movable brackets 7 and 8 and the segment member with which said levers may engage, substantially as set forth.

8. In combination with the truck and adjustable sprayer-frame mechanism mounted thereon and shaft G mounted on the sprayer-frame rods, the operating-lever Q pivoted to a portion of the framework, pins $h'$ designed to engage in registering apertures in the wheels H and in apertures in the supporting-rods in the shaft G, the rods R' connecting the said pins with the operating-lever, substantially as shown and described.

9. In combination with the truck and standards D mounted thereon, the brackets D' mounted on the said standards, the screw-threaded spring-actuated shafts $D^3$, the tank mounted on said shafts, the horizontally-disposed shaft $D^2$ mounted between said brackets, bevel-geared wheels on the said shafts and the operating-lever on the shaft $D^2$, whereby the said tank may be raised and lowered, substantially as shown and described.

In testimony whereof I affix my signature in presence of two witnesses.

THOMAS EUGENE MARTIN.

Witnesses:
EDWIN P. CLAPP,
EDSON H. MARTIN.